(12) United States Patent
Rhodes

(10) Patent No.: US 6,758,880 B1
(45) Date of Patent: Jul. 6, 2004

(54) ASSEMBLY AND METHOD FOR DISPOSING OF WASTE

(76) Inventor: Steven E. Rhodes, 8717 SW. 14th Ave., Portland, OR (US) 97219

(*) Notice: Subject to any disclaimer, the term of this patent is extended or adjusted under 35 U.S.C. 154(b) by 114 days.

(21) Appl. No.: 10/253,554

(22) Filed: Sep. 24, 2002

(51) Int. Cl.[7] .................................................. C05F 1/00
(52) U.S. Cl. ...................... 71/11; 71/15; 71/21; 71/22; 71/23; 435/290.1; 435/290.4
(58) Field of Search ................................ 71/11, 15, 21, 71/22, 23; 435/290.1, 290.2, 290.4, 262

(56) References Cited

U.S. PATENT DOCUMENTS

| | | | |
|---|---|---|---|
| 4,180,392 A | * 12/1979 | Ishibashi et al. | ............. 71/25 |
| 5,392,940 A | 2/1995 | Pierce | .................. 220/4.33 |
| 6,352,855 B1 | * 3/2002 | Kerouac | ............... 435/290.3 |
| 6,596,050 B1 | * 7/2003 | Rihtamo et al. | ............. 71/9 |

* cited by examiner

Primary Examiner—David A. Redding
(74) Attorney, Agent, or Firm—Law Office of Timothy E. Siegel; Timothy E. Siegel

(57) ABSTRACT

A method of disposing materials such as pet waste. First, an assembly is provided that has a container; a fitting for accepting and retaining a garden hose; a pressure nozzle for receiving water from the fitting and expressing the water under pressure; and a nozzle-retaining apparatus oriented so that the water expressed is directed into the container at an angle adapted to produce a churning motion within the container. Biodegradable material is placed into the container and the insertive coupler of a standard garden hose is attached into the fitting. Finally the faucet is turned on to cause water to flow through the hose and out the nozzle, thereby watering and stirring and fragmenting the biodegradable material while the operator remains at a distance far enough away from the container to avoid the unpleasant odor that is emitted from the container by virtue of the watering and stirring and fragmenting.

6 Claims, 3 Drawing Sheets

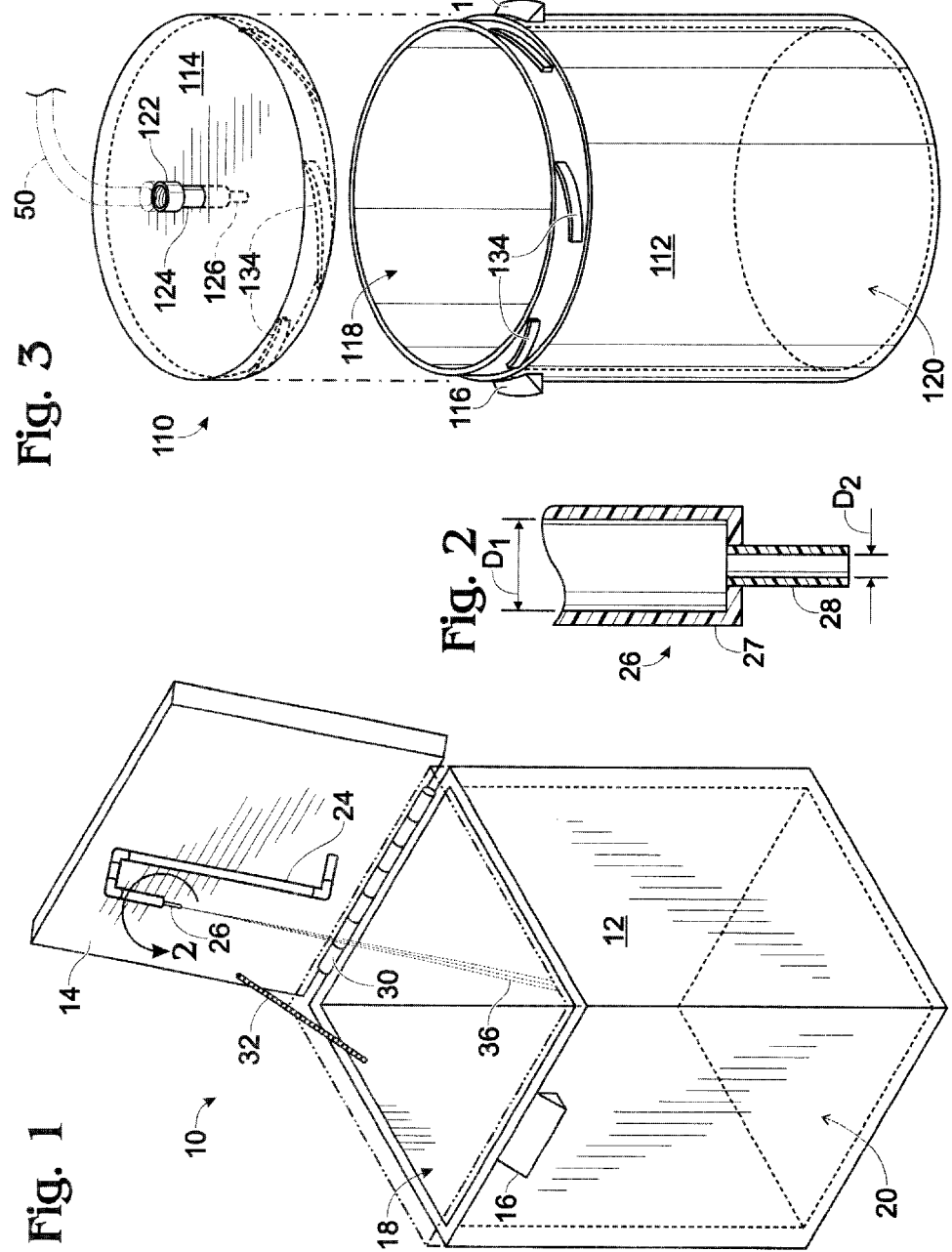

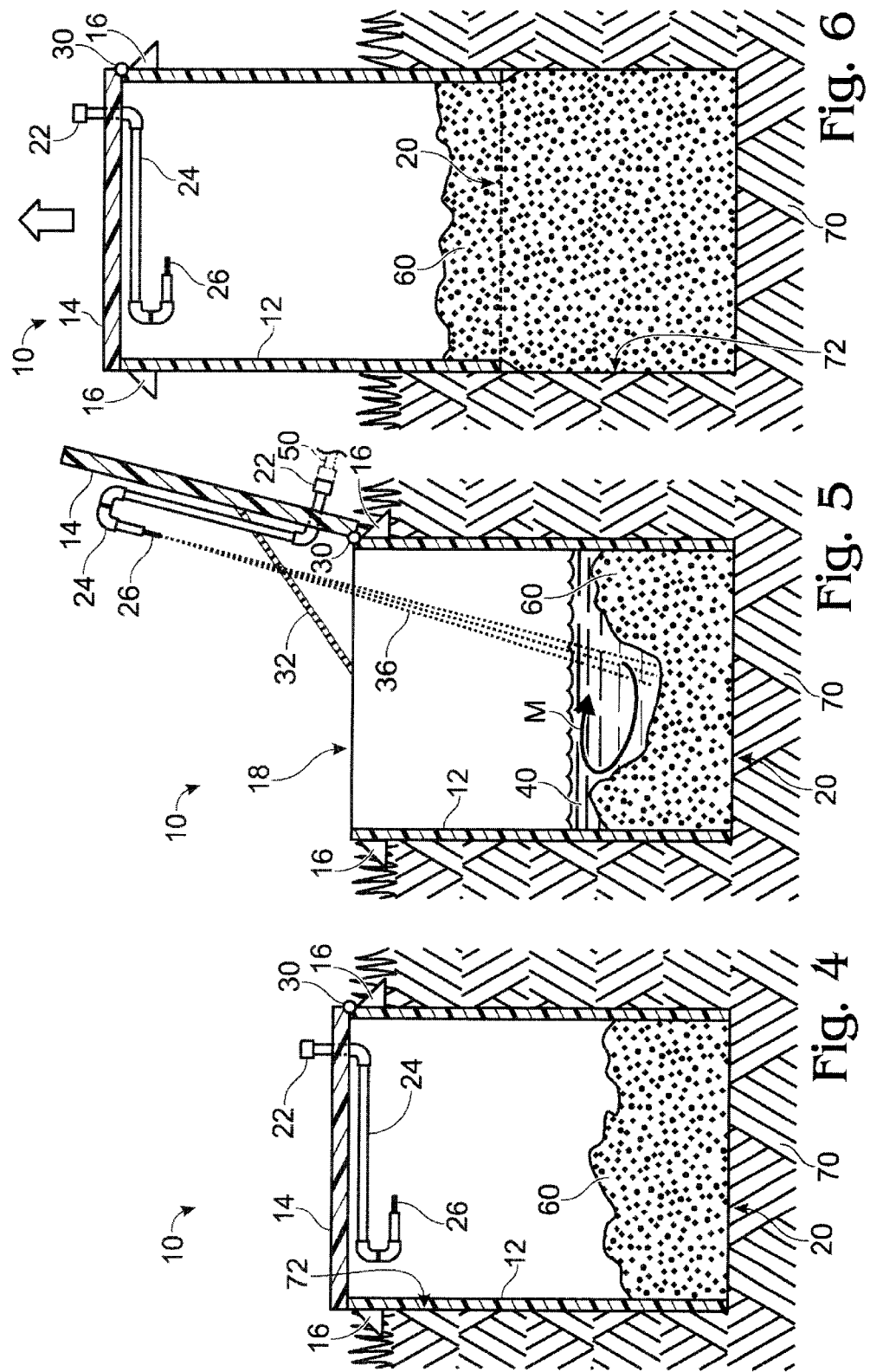

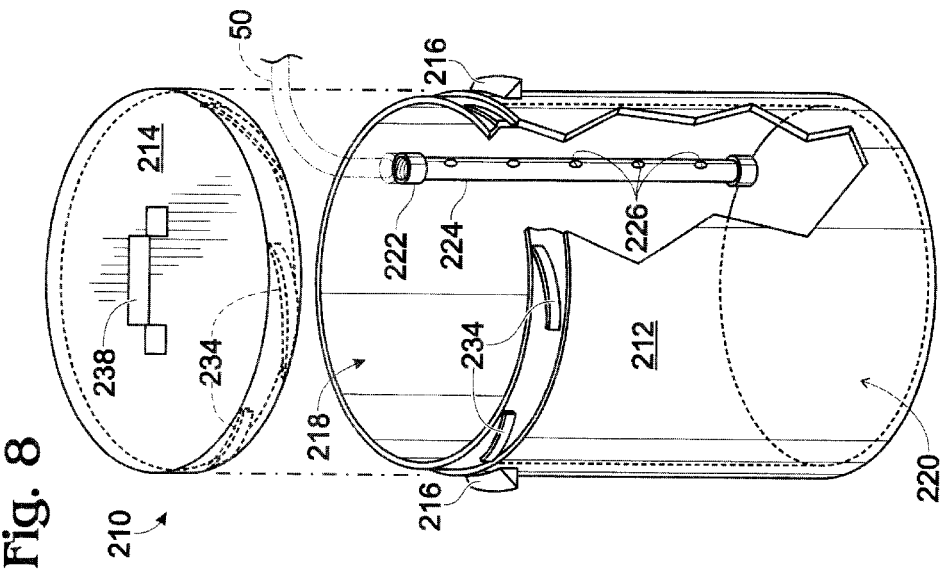
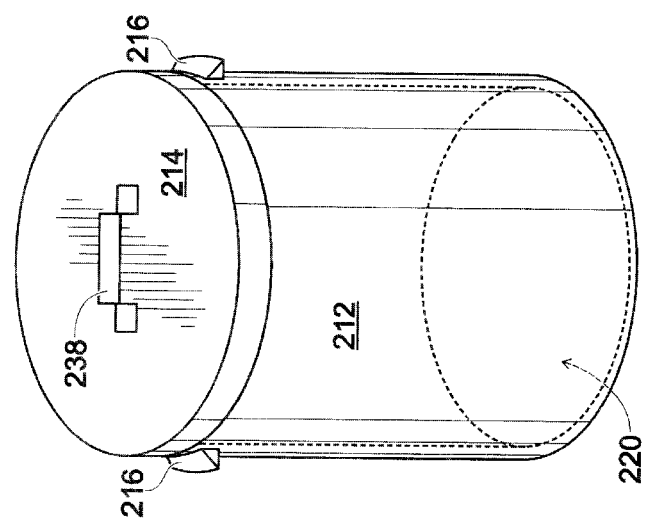

ASSEMBLY AND METHOD FOR DISPOSING OF WASTE

BACKGROUND OF THE INVENTION

Pet waste, or more specifically, pet fecal matter, is a problem and an ever-increasing one. Exposure to pet waste, in its worst case, can cause minor ill health and numerous, sometimes serious diseases. The offensive odor of pet waste alone makes it more than a mere nuisance. Disposing of pet waste in a manner that is both responsible and economical requires a solution.

Today, the generally accepted method of disposal of pet waste, particularly in high-density or urban areas, is to wrap pet waste in plastic and deposit it in a municipal garbage can. This practice however, can pose health hazards. In some population areas, pet owners are required to dispose of pet waste in a manner so as to avoid posing a health hazard. Trash Haulers and Recycling Technicians are of particular concern. As the value of recycling increases, and as trash and recycling companies continue to increase the number of people hired to separate recyclable products from general rubbish, the concern for health in these areas will continue to grow as well. Also, a growing number of unauthorized individuals—the homeless, for example—who sift through trash cans looking to recover valuable items can also be exposed to this type of health hazard.

It should be understood that canine waste specifically is the primary concern due to the nature of its content, predominantly meat products which are particularly offensive in decaying form, and due to the sheer volume of material produced collectively by large numbers of dogs. Pet waste, in all of its forms from all types of pets, however, is of similar concern.

As with large municipal sewage treatment plants, the addition of water to facilitate and accelerate the breakdown is quite necessary. The process of mixing pet waste with water, and the churning action necessary to accelerate the breakdown of the combined material, however, can quickly produce offensive, noxious, and sometimes overwhelming odors. It can be a very unpleasant task for a user to remain near the pet waste as this process is taking place.

Stationary devices that treat waste eventually fill up past the point at which they remain effective. There are several reasons they do so: 1) they contain an over-abundance of non-biodegradable material, such as rocks, twigs, etc. that is added inadvertently, and 2) the residue of decayed mass accumulates past the point at which the soil can sufficiently absorb additional material. The end result requires the user to either remove the contents manually or abandon the unit and acquire another for the same purpose. The options are time-consuming and costly.

There exist today several pet waste disposal systems that allow the treatment of pet waste by the pet owners or pet caregivers. Of those, some incorporate the soil to bury pet waste and utilize the natural breakdown and decay process (es) found in common soil. Those same systems advocate the addition of chemicals to assist the decay process. Only one recommends the addition of water but does not give the operator a convenient way to do so, nor does it allow the advantage of doing so from a sufficient distance away from the unit so as to avoid offensive odors. None use the force of water as a means to churn, mix, and fragment waste.

SUMMARY OF THE INVENTION

In a first preferred aspect, the present invention is a method of disposing of biodegradable material and of rejuvenating a patch of soil. To begin, a tube is provided that has a diameter between 10 cm and 10 meters. A hole is dug and the tube is placed, upright, in the hole, so that a little of the tube protrudes above the top of the hole. Biodegradable matter, such as pet waste, is placed in the tube and permitted to decompose. Finally, the tube is withdrawn from the hole leaving the decomposed material behind in the hole.

In a second separate aspect, the present invention is a method of disposing and treating a biodegradable material that produces an unpleasant odor when it is watered and stirred. First, an assembly is provided that has a container; a fitting for accepting and retaining the insertive coupler of a standard garden hose; a pressure nozzle in fluid communication with the fitting for receiving water from the fitting and expressing the water under pressure; and a nozzle-retaining apparatus oriented so that the water expressed from the nozzle is directed into the container at an angle adapted to produce a stirring motion within the container. Biodegradable material is placed into the container and the insertive coupler of a standard garden hose is attached into the fitting. Before or after this step, the receptive coupling of the standard garden hose is attached to a faucet. Finally the faucet is turned on to cause water to flow through the hose and out the nozzle, thereby watering and stirring and fragmenting the biodegradable material while the operator remains at a distance far enough away from the container to avoid the unpleasant odor that is emitted from the container by virtue of the watering and stirring.

In a third separate aspect the present invention is an assembly adapted to facilitate the disposing and treating of a biodegradable material that produces an unpleasant odor when it is watered and stirred and fragmented. The assembly includes a container and a fitting for accepting and retaining the insertive coupler of a standard garden hose. In addition, a pressure nozzle is in fluid communication with the fitting for receiving water from the fitting and expressing the water under pressure. Finally, a nozzle-retaining apparatus is oriented so that the water expressed from the nozzle is directed into the container at an angle adapted to produce a stirring motion within the container.

BRIEF DESCRIPTION OF THE DRAWINGS

FIG. 1 shows a perspective view of a pet waste disposal assembly according to the present invention.

FIG. 2 shows an enlarged cross-sectional view of the nozzle illustrated in FIG. 1.

FIG. 3 shows an exploded isometric view of an alternative preferred embodiment of the present invention, having a round body, a detachable lid, and a water introduction system centrally mounted in the lid.

FIG. 4 shows a cross-sectional view of the pet waste disposal assembly of FIG. 1, partially buried in the ground in an idle state.

FIG. 5 shows a cross-sectional view of the pet waste disposal assembly of FIG. 1, partially buried in the ground and showing the watering and stirring of the pet waste.

FIG. 6 shows a cross-sectional view of the pet waste disposal assembly of FIG. 1, being pulled from the ground.

FIG. 7 shows an exploded isometric view of an additional alternative embodiment of a pet waste disposal assembly according to the present invention, having a water introduction located within the body, in a closed, non-operational state.

FIG. 8 shows an exploded isometric cut away view of the pet waste disposal assembly shown in FIG. 7 with the lid off, showing the water introduction system running longitudinally along the body of the invention.

DETAILED DESCRIPTION OF THE PREFERRED EMBODIMENTS

Referring to FIGS. 1, 2, 4, 5 and 6 a preferred embodiment of the pet waste treatment assembly 10 includes a body 12 that is in the form of a tube, having a top opening 18 and a bottom opening 20. A lid 14 is attached to body 12 by a hinge 30. A standard garden hose receptive fitting 22 (FIG. 5) permits the attachment of a standard garden hose 50. In turn, fitting 22 is attached to a length of tubing 24, which is attached to a nozzle 26. In another preferred embodiment, the tubing 24 may be incorporated and integrated into the lid 14 of the unit sufficient to render the piping assembly and the lid as one piece in whole. As shown in FIG. 4, body 12 may be partially buried in the ground 70 and partially filled with pet waste 60.

Referring now specifically to FIG. 2, nozzle 26 has a first section 27 having a first diameter $D_1$ and a second section 28 having a second diameter $D_2$. Water speeds up through section $D_2$, as water must flow through section 28 at the same rate that it flows through section 27, requiring a higher rate of travel due to the smaller area available for fluid flow.

In order to facilitate the biological decomposition of the pet waste 60 it is advisable to periodically water and stir the pet waste 60. Unfortunately, this has heretofore been an unpleasant task for a human operator to perform, because this process produces an unpleasant odor. Using the assembly 10, however, an operator may attach the insertive coupler of a garden hose 50 to fitting 22 while lid 14 is closed. The operator may then open the lid, thereby positioning and orienting nozzle 26 so that it is directed at the waste 60. At this point the operator may add a chemical catalyst onto pet waste 60 to facilitate its decomposition.

After moving away from assembly 10 and to a faucet (not shown) to which the receptive coupler of the garden hose 50 is attached, the operator actuates the faucet, causing a water jet stream 36 to shoot from nozzle 26, thereby churning the waste 60 and creating a pool of water 40 and liquefied pet waste. Once the water 40 reaches a sufficient level without overflowing the unit, the faucet is turned off and the water gradually seeps through the pet waste and leaches through the bottom opening 20 and into the soil/earth 70 thereby continuing to facilitate the natural decay process of the pet waste 60. The operator may then wait until the unpleasant odor has abated before venturing to the assembly 10 to shut lid 14.

Skilled persons will recognize that the method described above successfully addresses the treatment of pet waste using water, the force of water, and organic activity as the means by which pet waste is successfully treated and ecologically disposed of, and does so in manner which allows pet owners to manage this process onsite, thereby avoiding municipal garbage systems altogether.

The importance of water as a medium to facilitate the break down of pet waste is paramount to successful treatment. In the method described above, the addition of water helps to: fragment large pieces of waste; loosen waste material to maximize the effectiveness of microbes to digest the material; aid in the even distribution of chemicals added in addition to water; and transport and distribute waste material in liquid form into the surrounding soil. A great advantage of this method is that it permits the operator to maintain the waste treatment assembly in one location for a comparatively long period of time. Without the frequent addition of water and chemicals, because the decomposition would not be accelerated, it would be necessary for the operator to move the assembly much more frequently.

After a period of use, body 12 may become almost entirely filled with pet waste 60. At this point, handles 16 may be used to pull body 12 out of the ground 72, leaving behind pet waste 60 and detritus, such as small twigs and leaves that are typically inadvertently collected together with pet waste. At this point the pet waste and the detritus have mixed together and have largely decomposed. The waste may now be covered with soil and allowed to further decompose, thereby providing a rich subsurface.

Referring to FIG. 3, an alternative preferred embodiment 110 has a body 112 in the form of a round tube, a shape that is generally less expensive to produce. A round lid 114 is fitted to body 112 by way of a set of diagonal, matching tabs 134, on body 112 and lid 114. A hose coupler receiving fitting 122 is oriented in tandem with tubing 124 and nozzle 126 so that water may be injected when the lid 114 is closed. One advantage of this embodiment is that the lid need not be raised in preparation for or after watering and stirring the pet waste.

Referring to FIGS. 7 and 8, in an additional alternative preferred embodiment, water is injected into the assembly 210 by way of a set of side nozzles 226 from a tube 224 extending along the interior side of a tubular body 212. Although a receptive fitting 222 for attachment of a standard garden hose is shown in the interior of body 212, in a variant of this embodiment, the fitting 222 extends through an aperture in the side of 212 so that a garden hose may be connected to it while the lid 214 is shut. In another embodiment, the piping assembly 224 may be incorporated and integrated into the body of the unit 212 sufficient to render the piping assembly and the body as one piece in whole. Also, in the embodiment of FIGS. 7 and 8, the absence of a fitting, such as fitting 122, at the center of lid 214 permits a handle 238 to be placed at this spot, to facilitate the rotation of lid 214, during opening and closing assembly 210.

Assembly 10, 110 and 210 are all preferably made of a tough polymeric material, such as that currently used for polymeric or plastic trash cans.

Although the preceding description contains many specificities, these should not be construed as limiting the scope of the invention but as merely providing illustrations of some of the presently preferred embodiments of this invention. For example, the lid retention means can be a chain, a rope, a locking mechanism in the hinge, etc.; the material of the invention can be plastic, metal, or some other lightweight rigid material; the hose attachment means can be either screw on or clamp on; the body can have other shapes, such as round, square, oval, triangular, etc.; the length and diameter of the body can vary significantly; the invention can operate in either the open or closed position, etc. Thus the scope of the invention should be determined by the append claims and their legal equivalents, rather than by the examples given.

What is claimed is:

1. A method of disposing and treating a biodegradable material that produces a foul stench when it is watered and stirred, comprising:
   (a) providing an assembly having:
      (i) a container;
      (ii) a fitting for accepting and retaining the insertive coupler of a standard garden hose;
      (iii) a pressure nozzle in fluid communication with said fitting for receiving water from said fitting and expressing said water under pressure; and (iv) a nozzle-retaining apparatus oriented so that said water expressed from said nozzle is directed into said container at an angle adapted to produce a stirring motion within said container;

(b) placing said biodegradable material into said container;

(c) attaching the insertive coupler of a standard garden hose into said fitting;

(d) attaching the receptive coupling of said standard garden hose to a faucet; and (e) actuating said faucet to cause water to flow through said hose and out said nozzle, thereby watering and stirring said biodegradable material while remaining at a distance far enough away from said container to avoid the foul stench that is emitted from said container by virtue of said watering and stirring.

2. The method of claim 1 wherein said nozzle-retaining apparatus is adjustable so that said nozzle may be moved into position for storage purposes between instances of nozzle use.

3. The method of claim 1 wherein said container is a tube partially buried in the ground and being open at its top and bottom.

4. The method of claim 1, wherein said tube is a circular tube.

5. The method of claim 1, wherein said assembly further includes a tightly fitting lid for said container.

6. The method of claim 1, wherein said assembly further includes at least one additional pressure nozzle, in fluid communication with said fitting.

* * * * *